(12) United States Patent
Poletto

(10) Patent No.: US 7,450,277 B2
(45) Date of Patent: Nov. 11, 2008

(54) SINGLE PASS DUPLEX DOCUMENT PATH FOR A DIGITAL SCANNER

(75) Inventor: Anthony G. Poletto, Fairport, NY (US)

(73) Assignee: Xerox Corporation, Norwalk, CT (US)

( * ) Notice: Subject to any disclaimer, the term of this patent is extended or adjusted under 35 U.S.C. 154(b) by 424 days.

(21) Appl. No.: 11/230,058

(22) Filed: Sep. 19, 2005

(65) Prior Publication Data

US 2007/0070449 A1    Mar. 29, 2007

(51) Int. Cl.
*H04N 1/04* (2006.01)
(52) U.S. Cl. ............... 358/498; 358/496; 358/474; 399/367; 399/374
(58) Field of Classification Search .......... 358/496, 358/498, 474, 401, 501, 505; 399/367, 374; 355/23; 382/312, 318, 319
See application file for complete search history.

(56) References Cited

U.S. PATENT DOCUMENTS

| | | | |
|---|---|---|---|
| 4,536,077 A | 8/1985 | Stoffel | |
| 5,438,435 A * | 8/1995 | Lawniczak | 358/496 |
| 5,463,451 A | 10/1995 | Acquaviva et al. | |
| 5,669,056 A | 9/1997 | Rubscha | |
| 5,689,792 A | 11/1997 | Acquaviva et al. | |
| 5,760,919 A | 6/1998 | Acquaviva et al. | |
| 5,903,811 A | 5/1999 | Kobayashi et al. | |
| 6,088,135 A * | 7/2000 | Kusumoto | 358/498 |
| 6,134,417 A * | 10/2000 | Fukasawa | 399/367 |
| 6,188,465 B1 | 2/2001 | Rees et al. | |
| 6,285,853 B1 | 9/2001 | Sano | |
| 6,563,611 B1 * | 5/2003 | Kao | 358/498 |
| 6,721,074 B1 | 4/2004 | Kao | |
| 6,728,012 B2 | 4/2004 | Bacher et al. | |

* cited by examiner

*Primary Examiner*—Cheukfan Lee
(74) *Attorney, Agent, or Firm*—Michael J. Nickerson; Basch & Nickerson LLP

(57) ABSTRACT

A document handling system includes an imaging area; a light source located in proximity to the imaging area; a raster imaging scanning system located in proximity to the imaging area; and a looped document path, located in proximity to the imaging area, having an entrance and an exit. The exit of the looped document path is positioned such that an exiting document is placed upon the imaging area a second time. Alternatively, the document handling system includes a semicircular document path, located in proximity to a first imaging area, having an entrance and an exit; and a second imaging area located in proximity to the exit of the semicircular document path. A bidirectional fiber optic element is located between the first and second imaging areas to transmit light from the light source to the second imaging area and light reflected from the second imaging area to the first imaging area.

7 Claims, 6 Drawing Sheets

SINGLE PASS DUPLEX DOCUMENT PATH FOR A DIGITAL SCANNER

BACKGROUND

Conventional automatic duplex documents sheet handling and imaging systems have increased the effective imaging, scanning, or copying rate for both sides of sets of duplex documents. Such conventional automatic document handlers automatically sequentially feed and image a set or job of plural duplex (two-sided) document sheets, while at the same, these conventional document handlers are capable of feeding and copying simplex documents (one-side). For example, a conventional automatic document feeder, which is particularly suited for imaging the documents electronically (digitally) while the document is moved past such an imaging station with a constant velocity transport, allows for a more compact and faster imaging document handler as compared to document handlers which place the document on a full size platen and hold the document stationary while it is scanned by a moving scanner.

A particular difficulty in duplex document handling for electronic imaging is the desirability of having only a single electronic imaging station. However, that requires inverting or turning over each duplex document after imaging one side thereof in order to image the other side of the duplex document, and/or reorienting the documents for collated restacking. In conventional duplex document handling systems, the inversion requirement required several time delays in which no document side (page) imaging is being accomplished, thus effectively reducing the effective imaging or duplex document copying rate of the overall system. Thus, it is desirable to provide a duplex document handling system with improved productivity or throughput rate for electronic document scanners.

Another problem with conventional automatic duplex documents sheet handling systems is the additional requirement of inverting the document twice in the overall document path in order to return the document sheet to the exit tray in the original order and be properly collated. As is well known, if documents are fed in forward serial order (1 to N page order) and are sequentially stacked on top of one another as the documents exit the system, regardless of whether the output tray is a separate tray or the original input tray, the document sheets must be stacked "face down" in order to remain collated and in proper order when fed in such forward or 1 to N page order. Otherwise, the sheets must be undesirably manually reordered after imaging.

Furthermore, conventional automatic duplex documents sheet handling systems have been constructed such that the input tray and the output tray of a document handler are in a vertical relationship to provide a more compact overall configuration and allow the document inversion path to be compactly interposed between the overlying upper and lower trays. In the conventional automatic duplex documents sheet handling systems having a vertical relationship, simplex documents are restacked face down and collated if the simplex documents are fed from the top of a face up stack in the input tray. However, this handling of a duplex document present a problem in that the duplex documents must be inverted a second time between the imaging of one side and the imaging of the other side of the duplex document. Moreover, a third inversion of the duplex document is required in order to allow the duplex document to be restacked properly collated in the output tray. This third inversion causes a productivity loss, especially where the inversion is done utilizing the path through the imaging station, preventing the imaging of any document in that time period.

Another example of a conventional duplex scanning system exposes both sides of a document while the document is moved along a continuous velocity path. Conventionally, two scan illumination stations are used, one for each side of the document, with the scanned images of the first side and the second side following two optical paths but imaged via the same imaging plane. Such two scan illumination stations require a moving mirror or a moving lens to bring projected images onto a common imaging plane. Optical components in motion can create optical misalignments and vibrations. Such motion is also time consuming and requires precision mechanisms which may be costly to manufacture.

A further example of a conventional duplex scanning system uses two raster image scanners in separate imaging planes to image both sides of the document to eliminate the need for a moving mirror or a moving lens. This conventional approach increases the manufacturing cost of the imaging system.

A still further example of a conventional duplex scanning system provide a system with two exposure stations, one for each side of the paper, but only one raster image scanner. At each imaging station, the document to be imaged passes over the top of a platen at each imaging station and light reflected from the side facing the platen is captured by a lens. The lens for the first imaging station captures the image of the first side reflected through the platen of the first imaging station. The lens array for the second imaging station captures the image of the second side reflected through the platen of the second imaging station and then transmits that the image to the raster image scanner through the platen of the first imaging station.

Therefore, it is desirable to provide a duplex document scanning system with improved productivity or throughput rate for electronic document scanners. Furthermore, it is desirable to provide a duplex document scanning system with a document path having a minimum number of inversions. Also, it is desirable to provide a duplex document scanning system with a document path that restacks the documents in a proper order. Moreover, it is desirable to provide a duplex document scanning system that utilizes only one raster image scanner, one illumination source, and one pass through the document path.

An automatic document handling system includes a first imaging area; a light source located in proximity to the first imaging area; a raster imaging scanning system located in proximity to the first imaging area; a semicircular document path, located in proximity to the first imaging area, having an entrance and an exit; a second imaging area located in proximity to the exit of the semicircular document path; and a bidirectional fiber optic element located between the first and second imaging areas. The bi-directional fiber optic element transmits light from the light source to the second imaging area and transmits light reflected from the second imaging area to the first imaging area.

An automatic document handling system includes a first imaging area; a light source located in proximity to the first imaging area; a raster imaging scanning system located in proximity to the first imaging area; a semicircular document path, located in proximity to the first imaging area, having an entrance and an exit; a second imaging area located in proximity to the exit of the semicircular document path; a first fiber optic element located between the first and second imaging areas; and a second fiber optic element located between the first and second imaging areas. The first fiber optic element transmits light from the light source to the second imaging area and transmits light reflected from the second imaging area to the first imaging area.

An automatic document handling system includes an imaging area; a light source located in proximity to the imaging area; a raster imaging scanning system located in proximity to the imaging area; and a looped document path, located in proximity to the imaging area, having an entrance and an exit. The exit of the looped document path is positioned such that an exiting document is placed upon the imaging area a second time.

BRIEF DESCRIPTION OF THE DRAWINGS

The drawings are only for purposes of illustrating an embodiment and are not to be construed as limiting, wherein.

DETAILED DESCRIPTION

Figure 1:
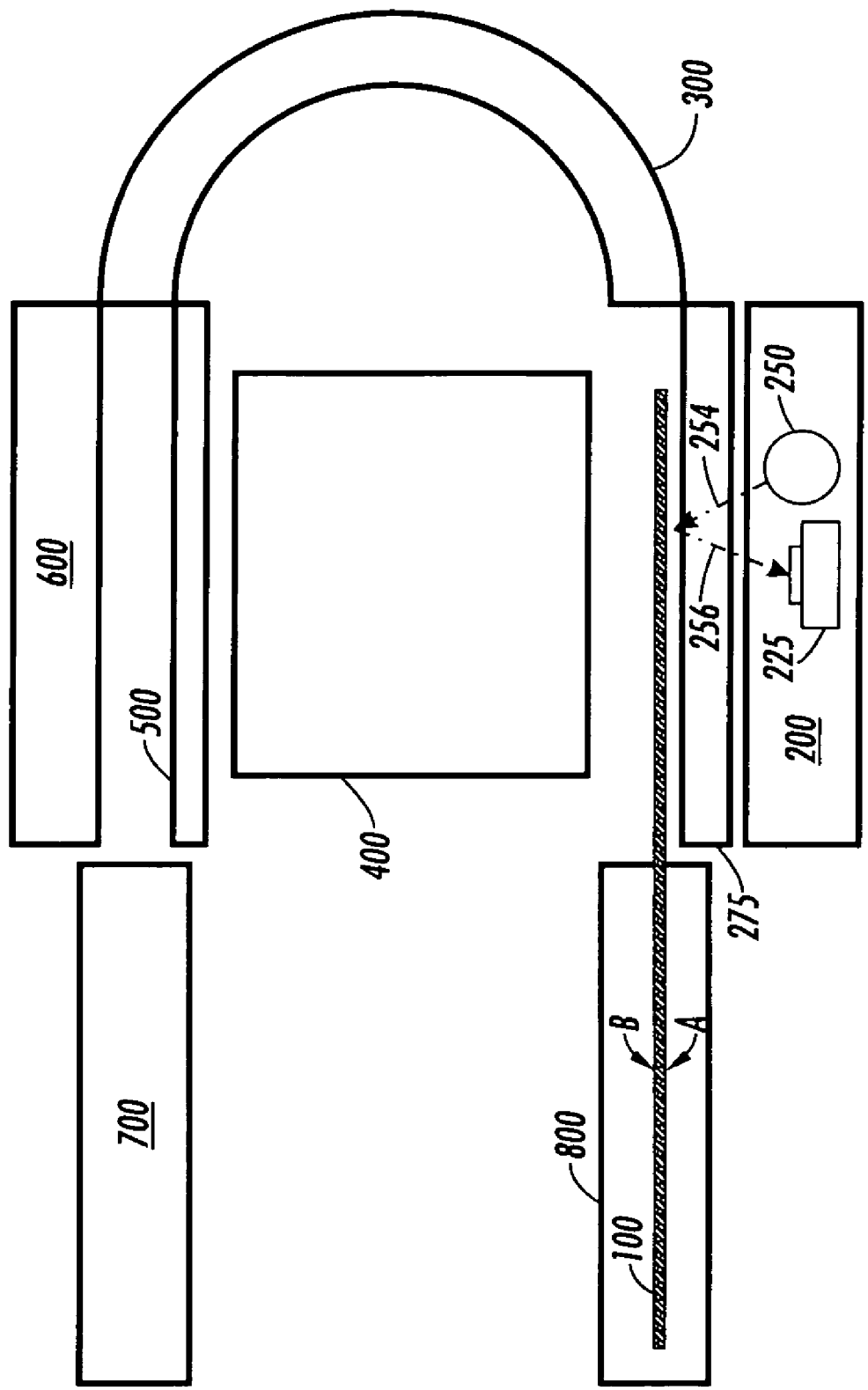
FIG. 1 is a diagram depicting scanning side one in a single pass duplex scanner.

For a general understanding, reference is made to the drawings. In the drawings, like references have been used throughout to designate identical or equivalent elements. It is also noted that the drawings may not be drawn to scale and that certain regions may have been purposely drawn disproportionately so that the features and concepts could be properly illustrated.

As noted above, it is desirable to provide a duplex document scanning system with improved productivity or throughput rate for electronic document scanners. Furthermore, it is desirable to provide a duplex document scanning system with a document path having a minimum number of inversions. Also, it is desirable to provide a duplex document scanning system with a document path that restacks the documents in a proper order. Moreover, it is desirable to provide a duplex document scanning system that utilizes only one raster image scanner, one illumination source, and one pass through the document path.

FIG. 1 illustrates an example of a duplex document scanning system. As illustrated in FIG. 1, the duplex document scanning system includes a digital scanning system 200 having a raster image scanner 225 with an accompanying light source 250. A document 100 is transported from an input tray or input staging area 800 to a first imaging area. The light source 250 illuminates a first side (A) of the document 100 through a first transparent platen 275. The first imaging area includes the first transparent platen 275 for imaging or scanning the document 100.

The first transparent platen 275 may be a full document platen wherein, after the document 100 is placed thereon, the digital scanning system 200 is moved across the first side (A) of the document 100 to generate successive scanlines of image data.

In a different configuration, the first transparent platen 275 may be a partial document platen wherein the digital scanning system 200 is stationary and the document 100, first side (A) facing the stationary digital scanning system 200, is moved across, at a constant velocity, the stationary digital scanning system 200 to generate successive scanlines of image data.

The successive scanlines of image data result from light 254 from the light source 250 illuminating the first side (A) of the document 100, light 256 being reflected therefrom, down through the first transparent platen 275, to the raster image scanner 225. The raster image scanner 225 may be a charge-coupled device or a full-width array.

The duplex document scanning system further includes a semicircular document path 300 that receives the document 100 exiting the first imaging area. The semicircular document path 300 provides a mechanism for inverting the document 100 before the document enters a second imaging area. The second imaging area includes a second transparent platen 500. In the second scanning area, a second side (B) of the document 100 faces the second transparent platen 500 and the digital scanning system 200. Thereafter, the document 100 is transported from the second imaging area to an output tray or output staging area 700.

The second transparent platen 500 may be a full document platen wherein, after the document 100 is placed thereon, the digital scanning system 200 is moved across the second side (B) of the document 100 to generate successive scanlines of image data.

In a different configuration, the second transparent platen 500 may be a partial document platen wherein the digital scanning system 200 is stationary and the document 100, second side (B) facing the stationary digital scanning system 200, is moved across, at a constant velocity, the stationary digital scanning system 200 to generate successive scanlines of image data.

It is noted that the duplex document scanning system further includes various rollers, nips, and drive motors (not shown) to enable the proper transporting of the document 100 from the input tray or input staging area 800 to an output tray or output staging area 700.

Between the first and second imaging areas, a fiber optic element 400 is located. The fiber optic element 400 may be a single fiber optic element that is capable of both transmitting light from the light source 250 to the second imaging area and transmitting reflected light from the second imaging area to the raster image scanner 225. In a different variation, the fiber optic element 400 may be two fiber optic elements, one capable of transmitting light from the light source 250 to the second imaging area and the other capable of transmitting reflected light from the second imaging area to the raster image scanner 225.

The duplex document scanning system also includes a background area or cover 600 for providing a background to enable document edge detection by the raster image scanner 225. The background area or cover 600 may also include a calibration target to provide the raster image scanner 225 with a reference for "absolute white."

It is noted that this calibration target may be located above the second transparent platen 500 since imaging of the light reflected from the calibration target will pass through both the first and second and lower transparent platens (275 and 500).

It is also noted that the above-described duplex document scanning system requires that a set of duplex originals be placed "face up" in the input tray and fed in 1 to N order. The multi-page document will then be delivered "face down" in the output tray but still in the proper order.

As illustrated in FIG. 1, the document 100 is transported from an input tray or input staging area 800 to a first imaging area. More specifically, the first side (A) of the document 100 is transported to the first transparent platen 275. The light source 250 illuminates the first side (A) of the document 100, with light 254, through the first transparent platen 275.

In a first configuration, the raster image scanner 225 progressively scans, receives reflected light 256, the first side (A) of the document 100 as the first side (A) of the document 100 passes over, at a constant velocity, the stationary raster image scanner 225. In a second configuration, the raster image scanner 225 progressively scans, receives reflected light 256, the first side (A) of the document 100 as raster image scanner 225 passes across the first side (A) of the stationary document 100.

Figure 2:
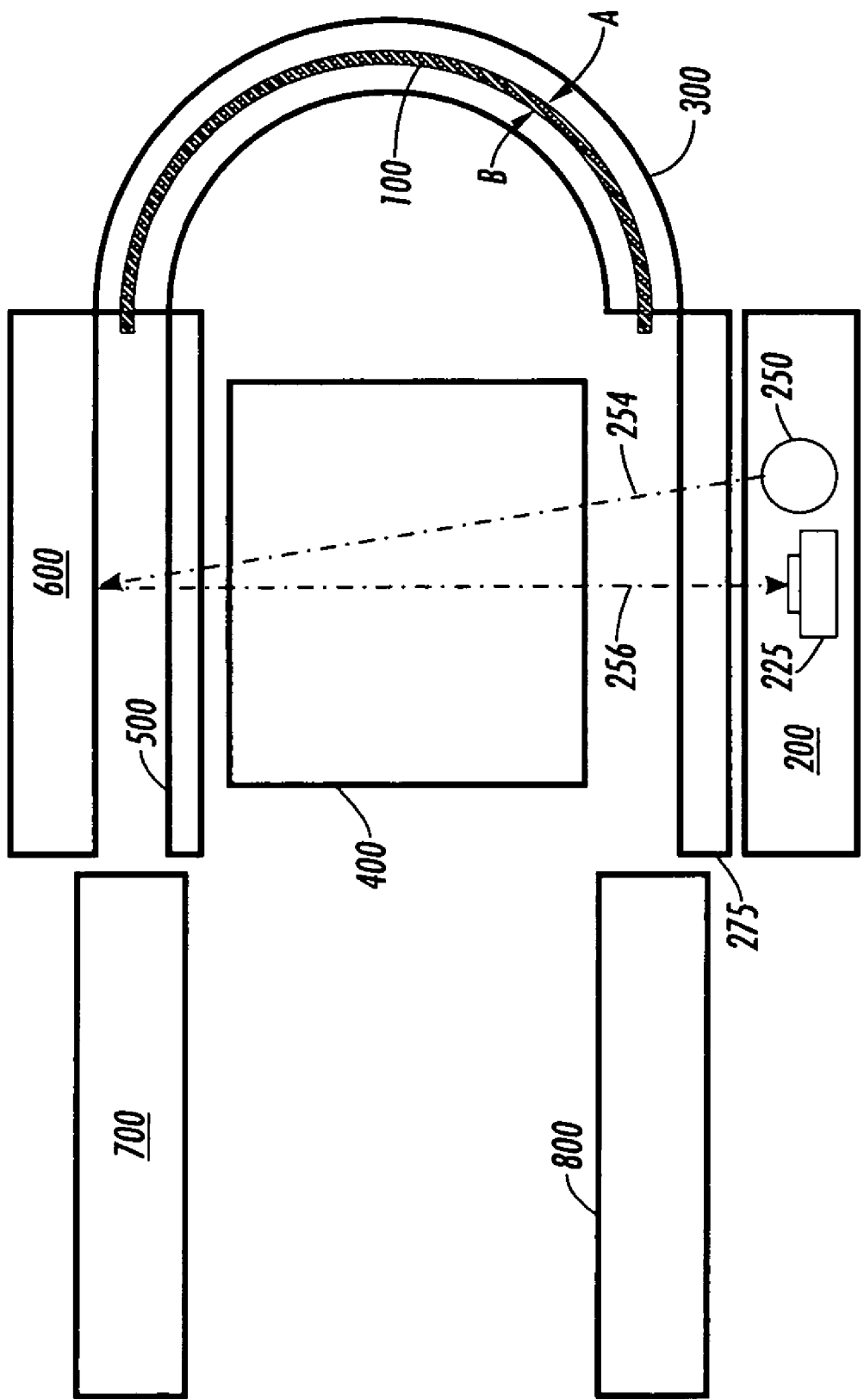
FIG. 2 is a diagram depicting preparation for scanning side two in a single pass duplex scanner.

As illustrated in FIG. 2, as the first side (A) of the document 100 exits the first imaging area, the document 100 enters the semicircular document path 300. The semicircular document path 300 inverts the document 100 with respect to the raster image scanner 225 without stopping the motion of the document 100 or reversal of the forward momentum of the document 100.

Figure 3:
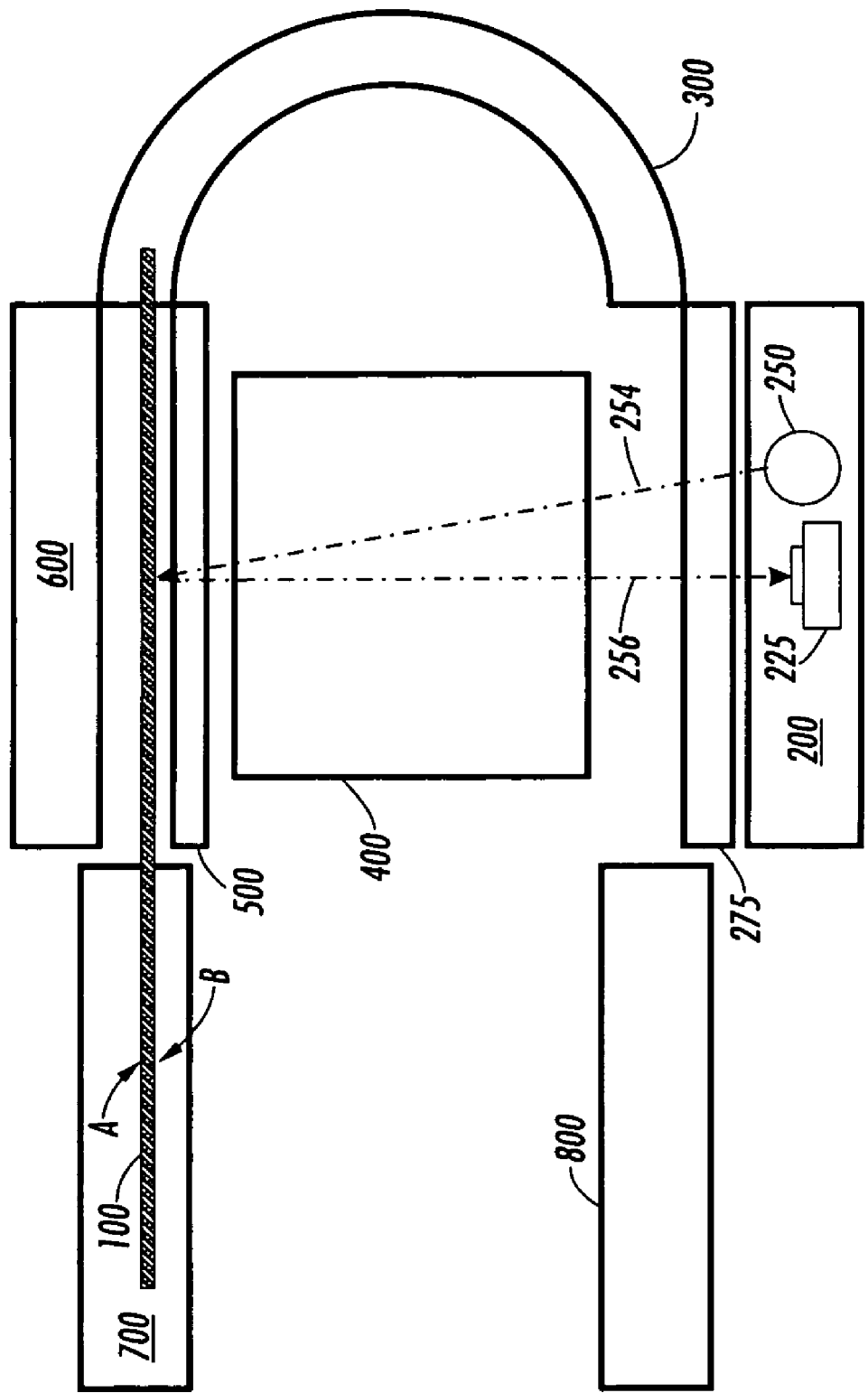
FIG. 3 is a diagram depicting scanning side two in a single pass duplex scanner.

As illustrated in FIG. 3, the document 100 is transported from an exit of the semicircular document path 300 to a second imaging area. More specifically, the second side (B) of the document 100 is transported to the second transparent platen 500. The light source 250 illuminates the second side (B) of the document 100, with light 254, through the first transparent platen 275.

In a first configuration, the raster image scanner 225 progressively scans, receives reflected light 256, the second side (B) of the document 100 as the second side (B) of the document 100 passes over, at a constant velocity, the stationary raster image scanner 225. In a second configuration, the raster image scanner 225 progressively scans, receives reflected light 256, the second side (B) of the document 100 as raster image scanner 225 passes across the second side (B) of the stationary document 100. Thereafter, the document 100 is transported from the second imaging area to an output tray or output staging area 700.

As illustrated in FIG. 3, the second side (B) of the stationary document 100 is illuminated by light 254 from light source 250 through the first transparent platen 275, the fiber optic element 400, and the second transparent platen 500. The light 256 reflected from the second side (B) of the stationary document 100 is received by the raster image scanner 225, after passing through the second transparent platen 500, the fiber optic element 400, and the first transparent platen 275.

As noted above, the fiber optic element 400 may be a gradient index lens array. The fiber optic element 400 may include a lens, such as a Selfoc Lens and an optical fiber or optical fibers. It is noted that the fiber optic element 400 may be two separate elements, one element for transmitting light to the second imaging area, and the other element for transmitting reflected light from the second imaging area.

It is noted that the gradient index lens array may include a plurality of light-conducting fibers made of glass or synthetic resin which have a refractive index distribution in a cross section thereof that varies parabolically outward from a center portion thereof. Each fiber acts as a focusing lens to transmit part of an image of an object placed near one end of the fiber. The assembly of fibers transmits and focuses sequential line scans of a document.

It is further noted that the duplex document scanning system may have been constructed in an opposite fashion than illustrated by FIGS. 1-3. More specifically, the output tray or output staging area 700 may have been positioned below the input tray or input staging area 800. In such construction, the document 100 would move in an opposite direction than described above.

Figure 4:
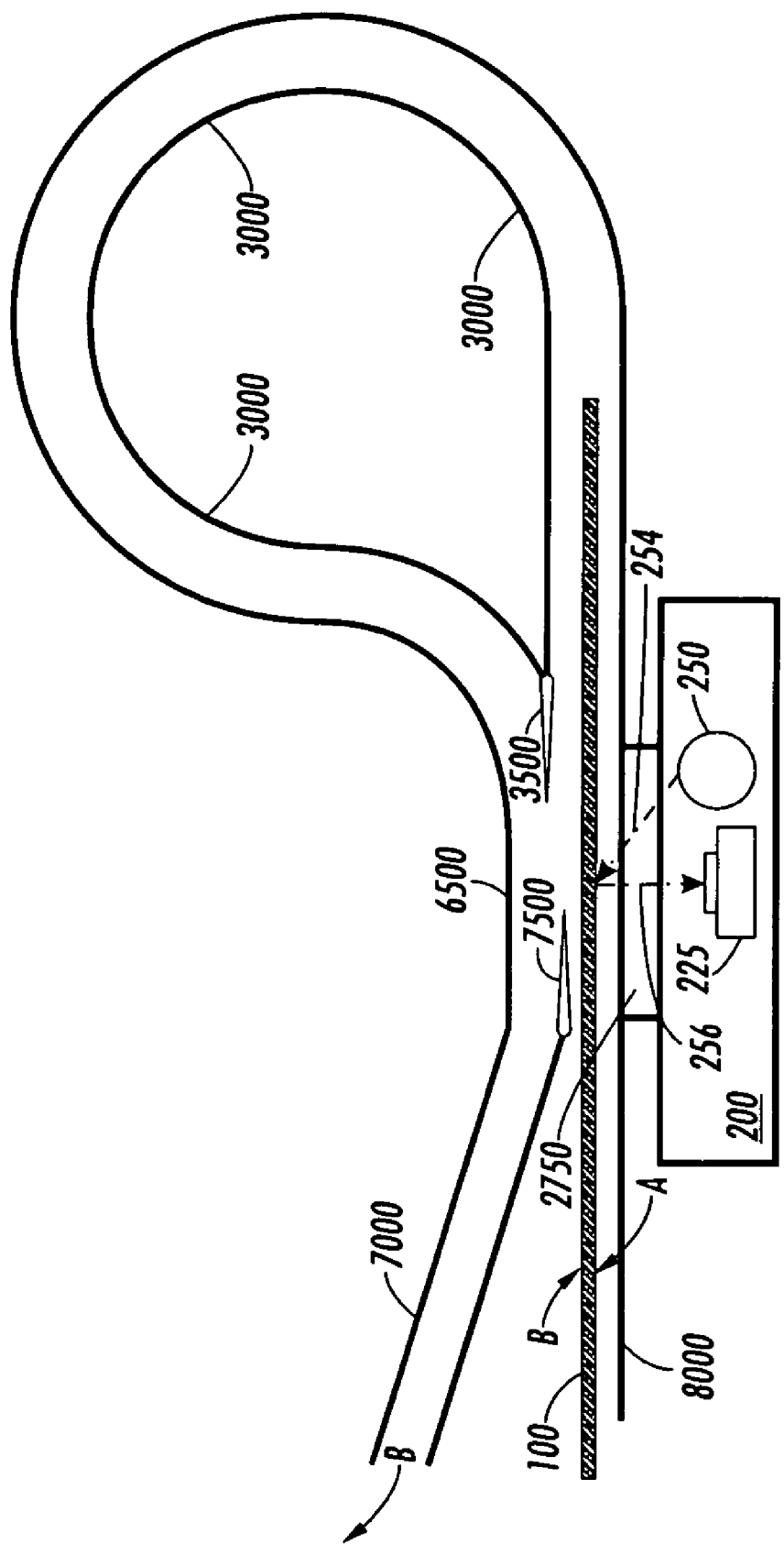
FIG. 4 is a diagram depicting scanning side one in a single pass duplex scanner.

FIG. 4 illustrates another example of a duplex document scanning system. As illustrated in FIG. 4, the duplex document scanning system includes a digital scanning system 200 having a raster image scanner 225 with an accompanying light source 250. A document 100 is transported from an input tray or input staging area 8000 to a first imaging area. The light source 250 illuminates a first side (A) of the document 100 through a transparent platen 2750. The imaging area includes the transparent platen 2750 for imaging or scanning the document 100.

The transparent platen 2750 may be a full document platen wherein, after the document 100 is placed thereon, the digital scanning system 200 is moved across the first side (A) of the document 100 to generate successive scanlines of image data.

In a different configuration, the transparent platen 2750 may be a partial document platen wherein the digital scanning system 200 is stationary and the document 100, first side (A) facing the stationary digital scanning system 200, is moved across, at a constant velocity, the stationary digital scanning system 200 to generate successive scanlines of image data.

The successive scanlines of image data result from light 254 from the light source 250 illuminating the first side (A) of the document 100, light 256 being reflected therefrom, down through the transparent platen 2750, to the raster image scanner 225. The raster image scanner 225 may be a charge-coupled device or a full-width array.

The duplex document scanning system further includes a looped document path 3000 that receives the document 100 exiting the imaging area. The looped document path 3000 provides a mechanism for inverting the document 100 before the document enters the imaging area a second time. Upon entering the imaging area a second time, a second side (B) of the document 100 faces the transparent platen 2750 and the digital scanning system 200. Thereafter, the document 100 is transported from the imaging area to an output tray or output staging area 7000.

It is noted that the duplex document scanning system further includes various rollers, nips, and drive motors (not shown) to enable the proper transporting of the document 100 from the input tray or input staging area 8000 to an output tray or output staging area 7000.

Figure 5:
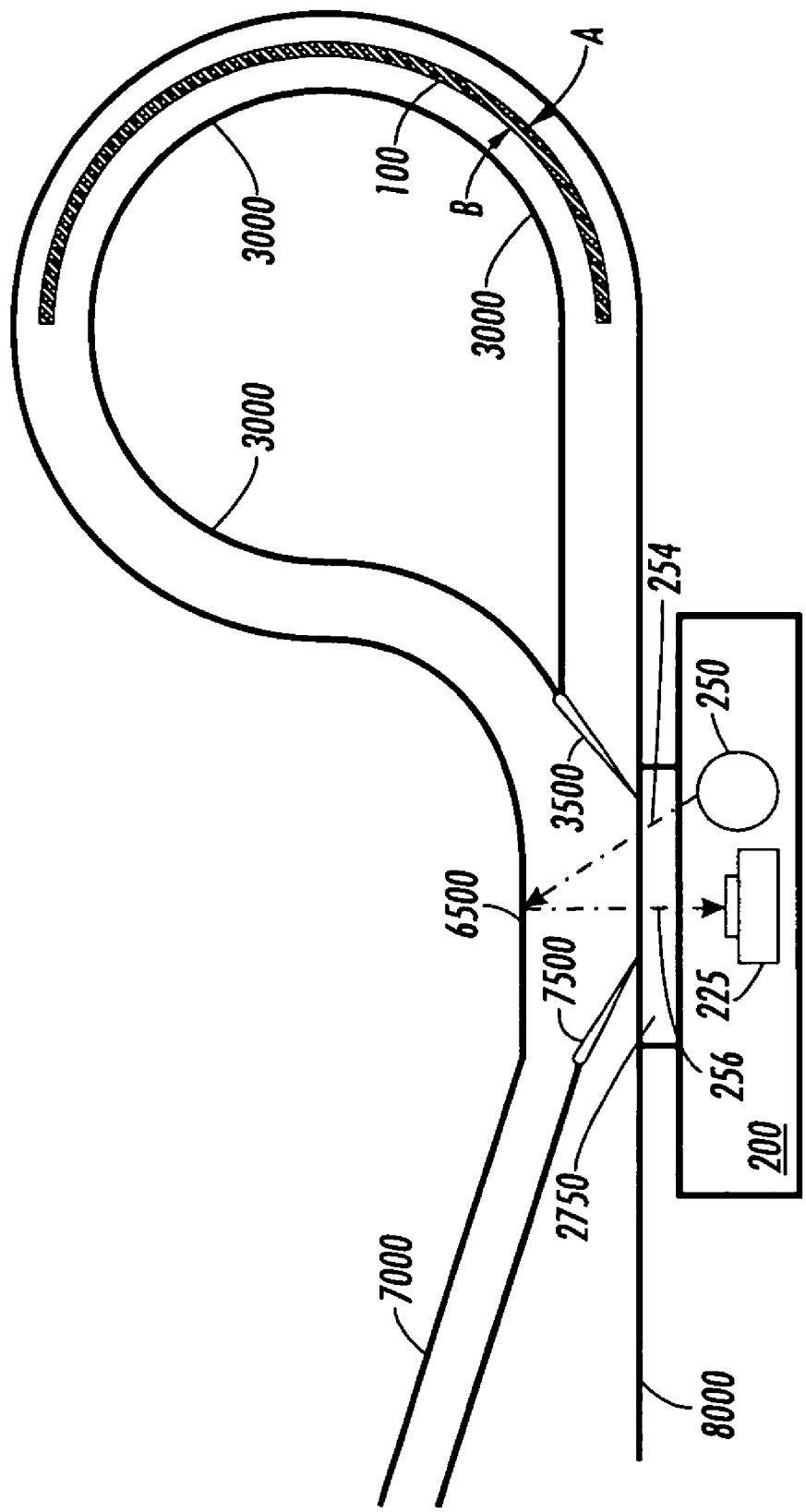
FIG. 5 is a diagram depicting preparation for scanning side two in a single pass duplex scanner.
Figure 6:
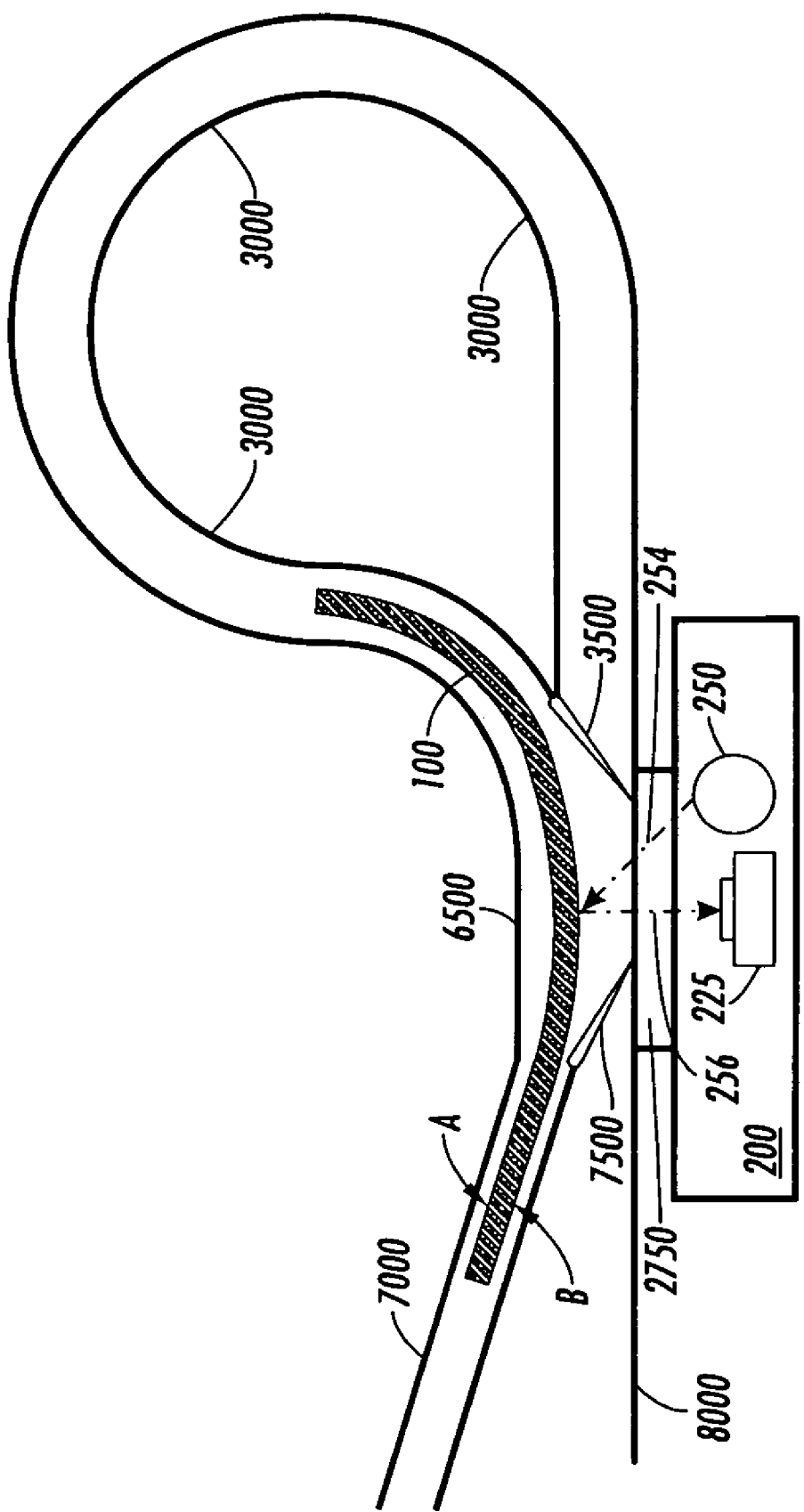
FIG. 6 is a diagram depicting scanning side two in a single pass duplex scanner.

At either end of the imaging area, as illustrated in FIG. 4, a gate is provided to direct the movement of the document 100. More specifically, when the document 100 is encountering the imaging area the first time, gates 3500 and 7500 are in a first position. The first position of gates 3500 and 7500, as illustrated in FIG. 4, causes the document 100 to properly exit the imaging area and enter the looped document path 3000. After a trailing edge of the document 100 properly enters the looped document path 3000, the gates 3500 and 7500 are moved to a second position. The second position of the gates 3500 and 7500, as illustrated in FIGS. 5 and 6, causes the document 100 to properly exit the looped document path 3000 and enter the imaging area a second time.

The duplex document scanning system also includes a background area or cover 6500 for providing a background to enable document edge detection by the raster image scanner 225. The background area or cover 6500 may also include a calibration target to provide the raster image scanner 225 with a reference for "absolute white."

It is noted that the above-described duplex document scanning system requires that a set of duplex originals be placed "face up" in the input tray and fed in 1 to N order. The multi-page document will then be delivered "face down" in the output tray but still in the proper order.

It is also noted that duplex document scanning system further includes various sensors (not shown) for tracking a position of the document; e.g., sensors for sensing the trailing and leading edges of the document 100.

As illustrated in FIG. 4, the document 100 is transported from an input tray or input staging area 8000 to an imaging area. More specifically, the first side (A) of the document 100 is transported to the transparent platen 2750. The light source 250 illuminates the first side (A) of the document 100, with light 254, through the transparent platen 2750.

In a first configuration, the raster image scanner 225 progressively scans, receives reflected light 256, the first side (A) of the document 100 as the first side (A) of the document 100 passes over, at a constant velocity, the stationary raster image scanner 225. In a second configuration, the raster image scanner 225 progressively scans, receives reflected light 256, the first side (A) of the document 100 as raster image scanner 225 passes across the first side (A) of the stationary document 100.

As illustrated in FIG. 5, as the first side (A) of the document 100 exits the imaging area, the document 100 enters the looped document path 3000. The looped document path 3000 inverts the document 100 with respect to the raster image scanner 225 without stopping the motion of the document 100 or reversal of the forward momentum of the document 100.

As illustrated in FIG. 6, the document 100 is transported from an exit of the looped document path 300 to the imaging area for a second time. More specifically, the second side (B) of the document 100 is transported to the transparent platen 2750. The light source 250 illuminates the second side (B) of the document 100, with light 254, through the transparent platen 2750.

In a first configuration, the raster image scanner 225 progressively scans, receives reflected light 256, the second side (B) of the document 100 as the second side (B) of the document 100 passes over, at a constant velocity, the stationary raster image scanner 225. In a second configuration, the raster image scanner 225 progressively scans, receives reflected light 256, the second side (B) of the document 100 as raster image scanner 225 passes across the second side (B) of the stationary document 100. Thereafter, the document 100 is transported from the second imaging area to an output tray or output staging area 700.

It is further noted that the duplex document scanning system may have been constructed in an opposite fashion than illustrated by FIGS. 4-6. More specifically, the output tray or output staging area 7000 may have been positioned below the input tray or input staging area 8000. In such construction, the document 100 would move in an opposite direction than described above.

It will be appreciated that variations of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. An automatic document handling system, comprising:
an input tray to contain a document to be imaged;
an imaging area to image a document;
an output tray to contain an imaged document;
a light source located in proximity to said imaging area;
a raster imaging scanning system located in proximity to said imaging area;
a looped document path, located in proximity to said imaging area, having an entrance and an exit;
a first gate located between said imaging area and said looped document path; and
a second gate located between said imaging area and said input tray and located between said imaging area and said output tray;
said second gate having a first position to guide a document from said input tray onto said imaging area;
said first gate having a first position to guide a document, which is exiting said imaging area for a first time, into said looped document path, said first position of said first gate being a lifted position;
said second gate being in said first position when said first gate is said first position;
said first gate having a second position to guide a document, which is exiting said looped document path, onto said imaging area;
said first position of said first gate being different from said second position of said first gate;
said second gate having a second position to guide a document, which is exiting said imaging area for a second time, to said output tray;
said first position of said second gate being different from said second position of said second gate.

2. The automatic document handling system as claimed in claim 1, wherein said imaging area includes a platen area.

3. The automatic document handling system as claimed in claim 1, wherein said raster imaging scanning system includes a full-width array.

4. The automatic document handling system as claimed in claim 1, wherein said raster imaging scanning system includes a charge-coupled device.

5. The automatic document handling system as claimed in claim 1, wherein said input tray is located in a vertical stacked relationship to said output tray.

6. The automatic document handling system as claimed in claim 1, wherein a document to be scanned moves across said imaging area with a constant velocity.

7. The automatic document handling system as claimed in claim 1, wherein a document to be scanned is stationary on said imaging area and said raster imaging scanning system moves across said imaging area.

\* \* \* \* \*